(12) United States Patent
Guttman et al.

(10) Patent No.: US 9,219,996 B2
(45) Date of Patent: Dec. 22, 2015

(54) MULTICAST TRAFFIC MANAGEMENT

(75) Inventors: Erik Guttman, Waibstadt (DE); Haris Zisimopoulos, London (GB)

(73) Assignee: Samsung Electronics Co., Ltd., Suwon-si (KR)

(*) Notice: Subject to any disclaimer, the term of this patent is extended or adjusted under 35 U.S.C. 154(b) by 44 days.

(21) Appl. No.: 13/695,529

(22) PCT Filed: Apr. 29, 2011

(86) PCT No.: PCT/KR2011/003209
§ 371 (c)(1),
(2), (4) Date: Oct. 31, 2012

(87) PCT Pub. No.: WO2011/136610
PCT Pub. Date: Nov. 3, 2011

(65) Prior Publication Data
US 2013/0058338 A1    Mar. 7, 2013

(30) Foreign Application Priority Data

Apr. 30, 2010  (GB) .................................. 1007295.7

(51) Int. Cl.
| | | |
|---|---|---|
| *H04W 4/08* | (2009.01) | |
| *H04L 12/18* | (2006.01) | |
| *H04L 12/761* | (2013.01) | |
| *H04W 8/18* | (2009.01) | |
| *H04L 29/12* | (2006.01) | |
| *H04W 4/06* | (2009.01) | |
| *H04W 40/00* | (2009.01) | |
| *H04W 48/02* | (2009.01) | |
| *H04W 84/04* | (2009.01) | |

(52) U.S. Cl.
CPC ............... *H04W 4/08* (2013.01); *H04L 12/185* (2013.01); *H04L 12/1836* (2013.01);
(Continued)

(58) Field of Classification Search
CPC ....... H04L 45/16; H04L 12/18; H04L 12/185; H04L 12/1886; H04L 29/06; H04L 69/32; H04W 4/06; H04W 72/005; H04W 76/002
USPC .......................... 370/432, 312, 390; 709/232
See application file for complete search history.

(56) References Cited

U.S. PATENT DOCUMENTS 7,346,053 B1 * 3/2008 Leung et al. .................. 370/390
7,983,205 B1 * 7/2011 Blease et al. .................. 370/312
(Continued)

FOREIGN PATENT DOCUMENTS

GB          2423438 A  *  8/2006
WO   2009/089643 A1      7/2009
WO   2009-129828 A1     10/2009

OTHER PUBLICATIONS

Piyush Harsh, An overlay solution to IP-multicast Address Collision Prevention, Proceedings of the IASTED International Conference on Internet and Multimedia Systems and Applications, Mar. 17-19, 2008, pp. 156-161.

*Primary Examiner* — Edan Orgad
*Assistant Examiner* — Steven Willmore
(74) *Attorney, Agent, or Firm* — Jefferson IP Law, LLP

(57) ABSTRACT

A method of routing multicast traffic, suitable for use in a network comprising a router node connected to a first data network and to a second data network, the router node having a capability to route multicast traffic from the first and second data networks to a user equipment, is provided. The method comprises: receiving a first message from the user equipment at the router node, the first message requesting membership of a first multicast group having a first multicast address; and inhibiting receipt of multicast traffic having the first multicast address from at least the second data network by the user equipment, dependent upon a determination as to whether the first message may relate to a multicast address in the first network.

27 Claims, 4 Drawing Sheets

(52) U.S. Cl.
CPC .............. *H04L 45/16* (2013.01); *H04W 8/186* (2013.01); *H04L 12/189* (2013.01); *H04L 29/12264* (2013.01); *H04L 29/12292* (2013.01); *H04L 61/2046* (2013.01); *H04L 61/2069* (2013.01); *H04W 4/06* (2013.01); *H04W 40/00* (2013.01); *H04W 48/02* (2013.01); *H04W 84/045* (2013.01)

(56) References Cited

U.S. PATENT DOCUMENTS

| | | | |
|---|---|---|---|
| 8,270,294 B2* | 9/2012 | Wu ............................... | 370/229 |
| 2002/0041594 A1* | 4/2002 | Suzuki et al. .................. | 370/390 |
| 2002/0091926 A1* | 7/2002 | Fukutomi ..................... | 713/170 |
| 2004/0260812 A1* | 12/2004 | Rhodes et al. ................. | 709/225 |
| 2005/0080901 A1* | 4/2005 | Reader .......................... | 709/226 |
| 2005/0108419 A1* | 5/2005 | Eubanks ........................ | 709/232 |
| 2005/0135364 A1* | 6/2005 | Kim .............................. | 370/390 |
| 2007/0082656 A1* | 4/2007 | Stieglitz et al. ............... | 455/411 |
| 2007/0086458 A1* | 4/2007 | Narayanan et al. ........... | 370/390 |
| 2007/0115975 A1* | 5/2007 | Zhang ........................... | 370/390 |
| 2007/0260689 A1 | 11/2007 | Chalmers et al. | |
| 2007/0286093 A1* | 12/2007 | Cai et al. ....................... | 370/254 |
| 2007/0293249 A1 | 12/2007 | Wang | |
| 2008/0025239 A1* | 1/2008 | Bossoli et al. ................ | 370/312 |
| 2008/0101376 A1* | 5/2008 | Do et al. ................... | 370/395.21 |
| 2008/0198848 A1* | 8/2008 | Yamagishi .................... | 370/390 |
| 2009/0036152 A1 | 2/2009 | Janneteau et al. | |
| 2009/0052407 A1* | 2/2009 | Motegi et al. ................. | 370/336 |
| 2009/0245157 A1 | 10/2009 | Song | |
| 2010/0014519 A1* | 1/2010 | Fernandez Gutierrez .... | 370/390 |
| 2010/0165988 A1* | 7/2010 | Soccol et al. ................. | 370/390 |
| 2011/0110286 A1* | 5/2011 | Lu et al. ........................ | 370/312 |
| 2012/0269059 A1* | 10/2012 | Gupta et al. .................. | 370/229 |

* cited by examiner

MULTICAST TRAFFIC MANAGEMENT

TECHNICAL FIELD

The present invention relates generally to data networks, and more specifically, but not exclusively, to a method and apparatus for improving management of multicast traffic in wireless networks.

BACKGROUND ART

Multicast traffic is typically a form of point to multi-point traffic, in which a user typically indicates an interest in receiving the traffic to a data network. The data network then may authorise the receipt of the traffic by the user equipment. Multicast traffic may be carried by many types of data network, including wireless networks, to provide services such as Multimedia Broadcast Multicast Service (MBMS). Wireless networks, in which a user equipment (UE) such as a mobile handset communicates via wireless links to a network of base stations or other wireless nodes connected to a telecommunications network, have undergone rapid development through a number of generations of radio access technology. The initial deployment of cellular systems using analogue modulation has been superseded by second generation (2G) digital cellular systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Multimedia traffic may typically be carried by 2G and 3G systems.

Conventional macro-cellular wireless base stations may serve a relatively large area in which there are a large number of customer premises and users. In order to improve capacity and coverage, and to provide additional services to users, Femtocell systems have been developed, which typically employ wireless router nodes which are typically low power base stations which may be sited on a customer's premises, typically residential premises, with a typically small area of coverage. A femtocell base station may be self-installed by a customer, and it may typically be connected by backhaul through a telecommunication network to a public data network and to a mobile operator's core network. A femtocell base station operating using UTRA radio access technology in a UMTS system may be referred to as an HNB (Home Node B).

A femtocell may also be used to connect a user equipment to a local network, such as a residential network or enterprise network, using a service known as Local Internet Protocol Access (LIPA). Typically, the connection will not use a cellular wireless operator's core network. This may, for example, allow a user to download content from a local network and for example to connect to internet protocol enabled devices in the home.

Multimedia Broadcast Multicast Service (MBMS) is a service offered typically by a cellular wireless operator, by which content may be multicast to a group of users, the group typically having an multicast address. Membership of the group may typically be managed by a protocol known as Internet Group Management Protocol (IGMP) or Multicast Listener Discovery (MLD). Some types of femtocell base station, such as for example some types of Home Node B, may be not be enabled to offer MBMS.

DISCLOSURE OF INVENTION

Technical Problem

The protocol, such as IGMP or MLD, used to manage group membership for services provided by a cellular operator's network, may also be used at a femtocell to manage group membership for local access services offered using LIPA. This may lead to operational problems given that the two networks are administered by different authorities. For example, if the same multicast address is used for both a group relating to the cellular operator's MBMS services and for local services using LIPA, unexpected traffic may result.

Solution to Problem

In accordance with a first aspect of the present invention, there is provided a method of routing multicast traffic, suitable for use in a network comprising a router node connected to a first data network and to a second data network, the router node having a capability to route multicast traffic from the first and second data networks to a user equipment, the method comprising:

receiving a first message from the user equipment at the router node, the first message requesting membership of a first multicast group having a first multicast address; and inhibiting receipt of multicast traffic having the first multicast address from at least the second data network by the user equipment, dependent upon a determination as to whether the first message may relate to a multicast address in the first network.

This has an advantage that receipt of multicast traffic from the second data network is inhibited at least in the case where the first message may relate to a multicast address in the first network.

Preferably, the method further comprises inhibiting receipt of multicast traffic having the first multicast address from the first data network by the user equipment, dependent upon the determination as to whether the first message may relate to a multicast address in the first network. This has an advantage that receipt of multicast traffic is inhibited at least in the case where the first message may relate to a multicast address in the first network, and a further advantage that implementation may be simpler since multicast traffic from both the first and second data networks may be inhibited.

In an embodiment of the invention, determining whether or not the first message may relate to a multicast address in the first network is performed at least in part by:

receiving an indication from the user equipment indicating that the user equipment has a capability to receive a multicast service using a multicast address in the first network; and determining that the first message may relate to a multicast address in the first network dependent on receipt of the indication.

This has an advantage that if it is determined that the user equipment may not have a capability to receive a multicast service using a multicast address in the first network, it may be determined that it is not be necessary to inhibit receipt of multicast traffic from the second data network.

In an embodiment of the invention, determining whether or not the first message may relate to a multicast address in the first network is performed at least in part by:

sending a second message from the wireless node to a serving node of the first data network, the second message requesting authorisation to join the first multicast group; and determining that the first message may relate to a multicast address in the first network dependent upon receipt of authorisation to join the first multicast group from the serving node of the first data network. This has an advantage that an up-to-date indication may be determined as to whether or not the first data network uses the first multicast address, that is to say whether or not the first message may relate to a multicast address in the first network.

In an embodiment of the invention, the method comprises determining whether or not the first message may relate to a multicast address in the first network by determining whether or not the first multicast address is present in a list of addresses of multicast groups relating to the first data network. This has an advantage that a message need not be sent to a serving node of the first data network.

In an alternative, said list is held at the router node. This has an advantage that signalling to another node may be reduced.

In another alternative, said list is held in a database held on a different node to which the router node has access. This has an advantage that a database need not be maintained at the router node.

The method may comprise sending the second message dependent on a determination that the first multicast address is not present in a list of addresses of multicast groups relating to the first data network. This has the advantage that it may be determined that the first data network uses the first multicast address, that is to say that the first message may relate to a multicast address in the first network, in the case that the list is out-of-date.

Preferably, the router node is a wireless router node. Aspects of the invention are particularly applicable to a wireless router node, since a user equipment may be connected to the wireless node and request membership of a multicast group.

The second message, in an embodiment of the invention, comprises an indication that the second message is originated by a wireless router node. This has an advantage that the server node may determine that the request is for authorisation in order to avoid a clash with a multicast address of a second data network.

The second message, in an embodiment of the invention, comprises an indication that a multicast service should not be provided. This has an advantage that the server node may determine that the request is for authorisation in order to avoid a clash with a multicast address of a second data network and accordingly not provide a multicast service.

Preferably, multicast traffic from the first network data network is provided by a Broadcast Multicast Service Centre.

The method may comprise discarding traffic having the first multicast address received from at least the second data network, dependent upon the determination that the first message may relate to a multicast address in the first network. This has an advantage that traffic having the first multicast address received from at least the second data network may not be routed to the user equipment, so inhibiting receipt of the traffic by the user equipment.

Alternatively, or in addition, the method comprises sending a message from the router node to the user equipment rejecting membership of the multicast group, dependent upon the determination that a multicast group of the first data network has the first multicast address. This has an advantage of inhibiting receipt of the traffic having the first multicast address by the user equipment.

In an embodiment of the invention, inhibiting of receipt of multicast traffic having the first multicast address from at least the second data network by the user equipment is implemented by not sending a message requesting membership of a first multicast group having a first multicast address. This has an advantage that the inhibiting of receipt of multicast traffic may be efficiently achieved.

The router node may be configured so as not to allow the user equipment to join the Multicast Broadcast Multimedia Service in response to receipt of the first message. This has an advantage of inhibiting receipt of the traffic having the first multicast address by the user equipment.

Preferably, the router node is a Home Node B.

Preferably, the first data network comprises a cellular wireless core network.

The second data network may comprise a residential data network.

Alternatively, the second data network may comprise an enterprise data network.

In accordance with a second aspect of the invention there is provided a router node, suitable for connection to a first data network and to a second data network, the router node having a capability to route multicast traffic from the first and second data networks to a user equipment, the router node being arranged to:

receive a first message from the user equipment, the first message requesting membership of a first multicast group having a first multicast address; and inhibit receipt of multicast traffic having the first multicast address from at least the second data network by the user equipment, dependent upon a determination that the first message may relate to a multicast address in the first network.

In accordance with a third aspect of the invention there is provided a method of routing multicast traffic, suitable for use in a network comprising a router node connected to a first data network and to a second data network, the router node having a capability to route multicast traffic from the first and second data networks to a user equipment, the method comprising:

receiving a first message from the user equipment at the router node, the first message requesting membership of a first multicast group having a first multicast address; and inhibiting receipt of multicast traffic having the first multicast address from at least the second data network by the user equipment, dependent upon a determination as to whether the user equipment is capable of supporting services using a multicast address in the first network.

In accordance with a fourth aspect of the invention, there is provided a router node, suitable for connection to a first data network and to a second data network, the router node having a capability to route multicast traffic from the first and second data networks to a user equipment, the router node being arranged to:

receive a first message from the user equipment, the first message requesting membership of a first multicast group having a first multicast address; and inhibit receipt of multicast traffic having the first multicast address from at least the second data network by the user equipment, dependent upon a determination as to whether the user equipment is capable of supporting services using a multicast address in the first network.

Further features and advantages of the invention will be apparent form the following description of preferred embodiments of the invention, which are given by way of example only.

MODE FOR THE INVENTION

By way of example embodiments of the invention will now be described in the context of a network including a Home Node B (HNB) wireless router node operating using UTRA radio access technology in a UMTS system, connected to both a data network comprising a cellular wireless core network and a data network comprising a residential or enterprise network. However, it will be understood that this is by way of example only, and that other embodiments may involve other types of data networks, and a router node using for example other access technologies such as IEEE802.16 Wimax systems; embodiments are not limited to using a particular access technology, or to wireless access technology.

Embodiments of the invention will now be described with reference to the network illustrated by FIG. 1.

Figure 1:
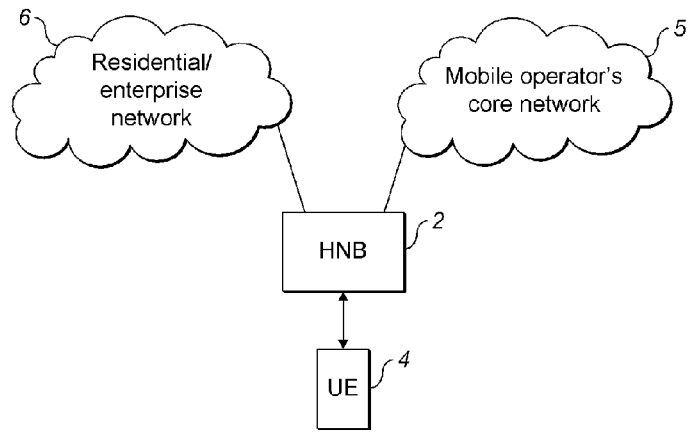
FIG. 1 is a schematic diagram showing a network according to an embodiment of the invention.

FIG. 1 illustrates a network, in which a femtocell wireless router node, known as Home Node B (HNB) 2, is connected to two data networks: a first data network comprising a mobile operator's core network 5, and a second data network comprising a residential/enterprise network 6. A user equipment 4 is in the area of coverage of the Home Node B 2 (typically at the user's premises) and is connected by a wireless link to the Home Node B 2. Multicast traffic may be provided to the user equipment via the Home Node B, from the mobile operator's core network 5, typically Multimedia Broadcast Multicast Service (MBMS) traffic, or from the residential/enterprise network 6, typically routed using Local Internet Protocol (LIPA) routeing. The residential/enterprise network may be referred to as the LIPA network.

In the network of FIG. 1, it is possible that a multicast address, used to route the multicast traffic, may be allocated to both the residential/enterprise network and the mobile operator's core network. This is because there may be little or no coordination of multicast address allocation between the operator of the residential/enterprise network and the mobile operator's network. This may lead to unwanted traffic and an unsatisfactory user experience. There may be, for example, a collision between multicast groups for MBMS services and LIPA routed traffic.

Multicast traffic is typically routed in response to a request from a user. In the case of MBMS, the request typically takes the form of a request for membership of a multicast group, the group having a multicast address. A serving node, typically in the mobile operator's core network, may authorise the user equipment to join the multicast group. The authorisation may be, for example, dependent on a subscription to a MBMS service.

A Home Node B 2 may not be enabled to provide a MBMS service. Nevertheless, it is advantageous that the Home node B 2 be capable of providing a multicast service to a user equipment based on traffic originating from the residential/enterprise network. However, if a user equipment sends a request to join a multicast group relating to a MBMS service that shares a multicast address with the residential/enterprise network, unwanted traffic may result.

According to a first embodiment of the invention, a first message is received from the user equipment 4 at the Home Node B 2 requesting membership of a first multicast group having a first multicast address. The multicast group may be associated with a service to which the user equipment has subscribed, and the user equipment may, for example have moved from an area of coverage of a mobile operator's regular macro-cellular network into the area of coverage of the Home Node B. The macro-cellular network does not typically offer Local IP Access (LIPA) services, and so the user may have been receiving, for example, a MBMS service with no problems of multicast address clashes. However, as the user equipment has now connected to the HNB 2, which has connections to both the mobile operator's core network 5 and also connections to a residential or enterprise network 6, according to the first embodiment the Home Node B 2 sends a message to a serving node of the cellular operator's core network 5 requesting authorisation to join the first multicast group. This message is intended to determine whether or not the first multicast address is used by the cellular operator's core network 5, that is to say whether the first message may relate to a multicast address in the cellular operator's core network; if authorisation to join the group is received, this is taken as a determination that the cellular operator's core network uses the first address.

If it is determined that the cellular operator's core network uses the first address, that is to say the first message may relate to a multicast address in the cellular operator's core network, then the receipt by the user equipment of multicast traffic having the first multicast address from the residential or enterprise network 6, that is to say LIPA traffic having the first multicast address, is inhibited. This inhibition may involve not sending a message to the residential or enterprise network 6 requesting membership of the first multicast group having the first multicast address. This inhibition may alternatively, or in addition, involve discarding the traffic at the Home node B 2, that is to say by not routeing the LIPA traffic. In this way, a clash is avoided, and MBMS traffic may continue to be routed, where the capabilities of the Home Node B allow this. The Home Node B 2 may also send a message to the user equipment 4 rejecting membership of the multicast group.

If, however, it is determined that the cellular operator's core network 5 does not use the first address, that is to say the first message may not relate to a multicast address in the cellular operator's core network, then the receipt by the user equipment of multicast traffic having the first multicast address from the residential or enterprise network, that is to say LIPA traffic having the first multicast address, is not inhibited, since in this case there is unlikely to be a conflict of multicast addresses. In this case, a message may be sent to the residential or enterprise network 6 requesting membership of the first multicast group having the first multicast address.

According to a second embodiment of the invention, a similar determination is carried out as to whether or not the cellular operator's core network 5 uses first multicast address, that is to say whether the first message may relate to a multicast address in the cellular operator's core network. However, in the second embodiment, if it is determined that the cellular operator's core network 5 uses the first address, that is to say the first message may relate to a multicast address in the cellular operator's core network, then the receipt by the user equipment of multicast traffic having the first multicast address from the residential or enterprise network, that is to say LIPA traffic having the first multicast address, is inhibited, as in the first embodiment, but also receipt of multicast traffic from the operator's core network having the first multicast address is inhibited. This inhibition may involve discarding the traffic at the Home node B 2, that is to say by not routeing the traffic, or it may be by sending a message to the user equipment rejecting membership of the requested multicast group. Alternatively or additionally, the inhibition may involve sending a message to the serving node of the mobile operator's core network indicating that membership of the multicast group is not required. This message may be in the form of an indication that the authorisation request is for the purposes of determining whether a multicast address is used by the mobile operator's core network for the delivery of an MBMS service.

In this way, a clash is avoided. The user may go back into the area of coverage of the macro-cellular network to continue with MBMS service.

Variants of the first and second embodiments are possible, in which the determination that a multicast group of the cellular operator's core network uses the first multicast address, that is to say whether the first message may relate to a multicast address in the cellular operator's core network, is made by determining whether or not the first multicast address is present in a list of addresses of multicast groups relating to the first data network. The list may be held at the Home Node B 2 or held in a database in a different node to which the Home Node B 2 has access. These approaches have the advantage that signalling may be reduced. Receipt of traffic having the first multicast address from either or both data networks may be inhibited by not sending the request to join the multicast group to the respective network or networks. Alternatively, the methods of inhibiting receipt of traffic described in connection with the first and second embodiments may be employed.

In further variants of the first and second embodiments of the invention, it is determined whether the first message may relate to a multicast address in the mobile operator's core network at least in part by receiving an indication from the user equipment indicating that the user equipment has a capability to receive a multicast service, for example MBMS, using a multicast address in the first network. If no such indication is received, then traffic from the LIPA network may not be inhibited. However, if an indication is received, then a determination as to whether a multicast group of the mobile operator's core network may use the first multicast address may proceed, according to the methods described in connection with the first or second embodiments. Alternatively, traffic from the LIPA network may be inhibited on the basis of receiving the indication from the user equipment.

It is possible in a further variant to send the message requesting authorisation dependent on the multicast address not being on the list, as a form of double checking.

Embodiments of the invention will now be described in more detail, and further embodiments will also be described.

Figure 2:
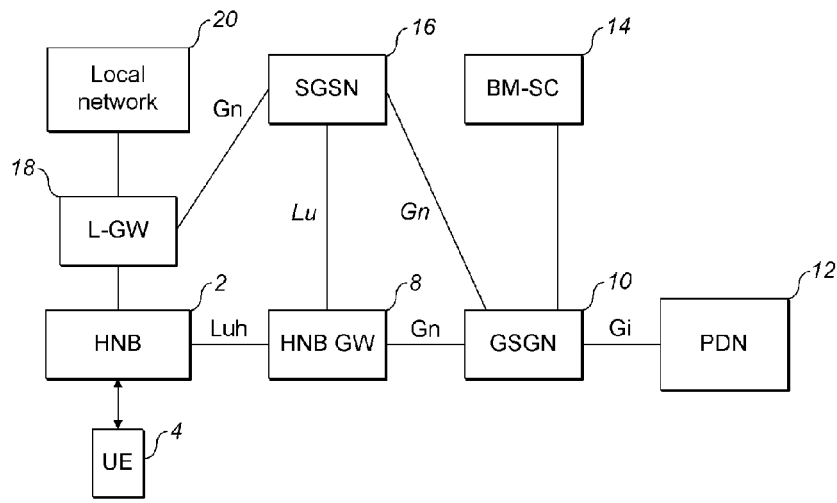
FIG. 2 is a schematic diagram showing a network according to an embodiment of the invention.

FIG. 2 illustrates an example of the network of FIG. 1 shown in more detail. The mobile operator's core network 5 may comprise a Home Node B GateWay (HNB GW) 8, a Gateway General Packet Radio Service Support Node (GGSN) 10, a Serving GPRS Support Node (SGSN) 16 and a Broadcast Multicast Service Centre (BM-SC) 14. The BM-SC 14 may be the serving node in mobile operator's core network that authorises membership of a multicast group. The mobile operator's core network may be connected to a Public Data Network (PDN) 12, typically giving Internet access. The HNB 2 is also connected via a Local GateWay (L-GW) 18 to a local network 20, that may comprise parts of a residential or enterprise network. Routeing of traffic via the L-GW 18 from the residential/enterprise network typically uses LIPA.

Multicast applications receive IP traffic that is routed based on an Internet Protocol (IP) multicast address. In order to receive multicast traffic from a mobile operator's core network, a user equipment 4 may be required to have membership of a multicast group having a multicast address. Multicast group membership is managed and indicated by the UE to the network by means of a protocol called the "Internet Group Mangement Protocol" (IGMP) or "Multicast Listener Discovery" (MLD).

Typically, the gateway, such as a GGSN 10 responsible for forwarding IP packets from a public data network (PDN) 12 to the user equipment 4 receives this IGMP/MLD message and determines whether to provide multicast traffic to the UE 4 by means of multicast mode MBMS, dependent upon whether or not multicast service is authorized by the operator of the network proving the multicast traffic. This decision is taken based upon interaction with between the BM-SC 14 and the GGSN 10 using a reference point known as Gmb.

LIPA is a form of network connection particularly for 3GPP access such as UTRAN. In LIPA IGMP may be used to allow multicast routing between the UE and a residential or enterprise network directly, that is to say typically not using the mobile operator's core network. This is preferable to permit multicast traffic used for service discovery, so the UE 4 can find home services using e.g. Universal Plug and Play (UPnP) or potentially also make use of multicast applications present in the enterprise or residential network.

However, it is possible that the same multicast address may be used by both the residential/enterprise network and the mobile operator's core network. This may lead to unwanted traffic and an unsatisfactory user experience. That is to say, there may be a collision between Multicast groups for operator services and LIPA routed traffic.

A UE 4 may normally use a multicast service while under 3G access, using multicast mode MBMS, or under any access (GERAN, UTRAN or LTE) via an external PDN. The multicast MBMS is typically associated with a multicast group, and the multicast group is associated with a particular IP address (that we will refer to as G). If the same group G is offered by the local network (residential or enterprise network) for example for the purposes of service discovery in the residential or enterprise network, the UE may join the group G via IGMP and get unexpected traffic via multicast from the same group. This could cause the application that uses MBMS multicast delivery mode to fail or at the very least to behave unexpectedly.

This is a particular problem, since user equipments are typically not aware whether the packet data protocol (PDP) context (i.e the connection) that they use in order to send a IGMP/MLD join request is "broken out" for LIPA. Typically, the UE 4 activates a general purpose PDP context if one is not already established. The UE 4 then typically sends an IGMP (IPv4) or MLD (IPv6) Join message over the default PDP context to signal its interest in receiving a particular multicast MBMS bearer service identified by an IP multicast address.

Typically, MBMS specifications do not impose restrictions on the PDP context that will be used in order to transport the IGMP/MLD Join message that will be used to activate the MBMS multicast delivery mode transmissions.

It is a problem to avoid the situation in which the UE 4 receives data inappropriately from group G that is used in the residential or local enterprise network when it expects this as an operator, i.e. cellular network operator, MBMS service. Regarding the operator MBMS service, the UE 4 can request membership of a group by means of IGMP/MLD and this will be handled either by means of MBMS multicast mode, or, if not authorised, the IGMP request will simply be ignored.

Regarding LIPA, the residential or local enterprise network where the IP traffic egresses (reference point Gi) is under the direct control of the user or enterprise network administrator, potentially independently of the mobile network operator, therefore there may be possible for a user to configure a IP multicast group which clashes with existing IP multicast groups allocated for MBMS services.

Aspects of the present invention provide a solution to this problem by at least providing a mechanism to prevent IP multicast group collisions. Before the HNB 2 proceeds to route multicast traffic for a group G to the UE, it first checks to determine whether, in the operator's core network (that is to say typically the mobile operator's core network, not using LIPA) the group G is already supported for MBMS services.

According to an embodiment of the invention, the HNB 2 sends a message to a serving node of the operator's core network requesting authorisation to join a multicast group having a first multicast address. That is to say, the HNB initiates a Gmb MBMS Authorization Request. If the group exists and authorization can be obtained, then the group that the UE requests from the LIPA access via IGMP/MLD is not routed to the UE. Preferably, the HNB does not employ the MBMS Registration Procedure, so multicast traffic will not be initiated by the BS-MC 14.

The UE 4 is still able to join multicast groups that are not used as MBMS multicast mode services in the LIPA network; this is not blocked by the HNB. For example, the UE 4 may join multicast based service discovery protocol groups that are not used for MBMS services.

The functionality required in the HNB 2 and L-GW 18 is effectively a "filter" that will route IGMP/MLD join requests (that is to say messages requesting membership of a multicast group) typically only when it receives indication from the network that the group that the UE 4 attempts to join is not used for MBMS services.

Figure 3:
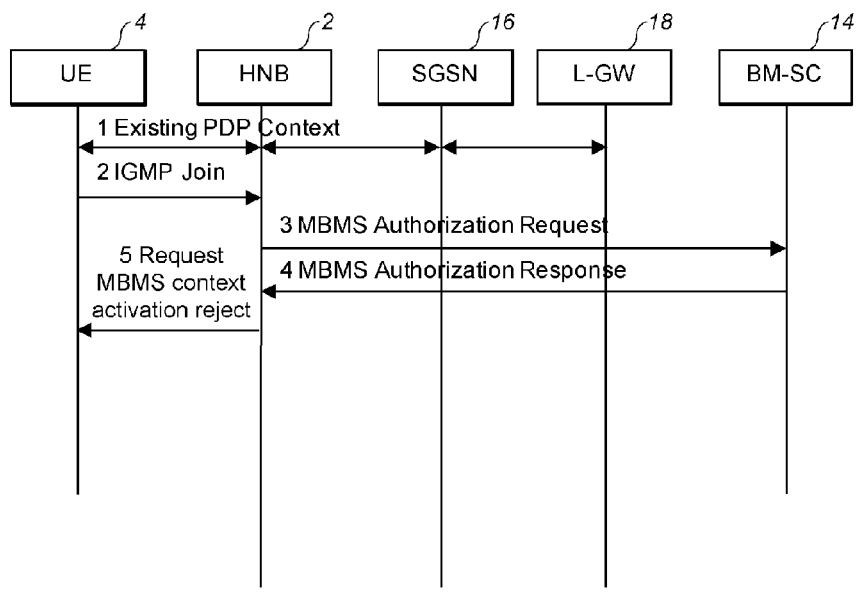
FIG. 3 is a schematic diagram showing transmission of messages according to an embodiment of the invention.

FIG. 3 shows a typical interaction between the HNB 4 and an operator's core network in order to determine whether a given IGMP/MLD join message will collide with an existing multicast mode MBMS service.

Step 1 shows the conventional set up of a connection (PDP context) between the UE 4 and the L-GW 18 with LIPA activated. The UE is unaware of the fact that the PDP context has LIPA activated.

At step 2, the UE 4 sends a message requesting authorisation to join a multicast group to a serving node of the operator's core network, typically the BM-SC 14, that is to say the user equipment initiates an IGMP/MLD join message in order to initiate MBMS multicast mode.

The HNB 2 attempts to verify whether the group exists and the UE 4 is authorized to use it in the macro network. Potentially this verification can optionally be triggered only when the UE 4 has indicated that it has MBMS capability in its MS Network Capabilities. This may be accomplished by using the Gmb interface to a serving node of the mobile operator's network, typically the BM-SC 14, or alternatively the serving node may be a statically defined Authorisation Server in the Public Land Mobile Network (PLMN), that is to say the mobile operator's network, that implements the Gmb authorization function of the BM-SC 14. The IP address of the BM-SC 14 or Authorisation Server is preferably statically configured in the HNB 2. The HNB 2 may preferably identify itself by setting in the Gmb Authorisation request an identifier indicating that this request is performed by HNB (instead of GGSN) and is authorization in order to avoid clashes due to LIPA.

If the serving node authorizes this use, the HNB 2 assumes that there is such a group existing and inhibits receipt of traffic by the user equipment on the requested group from the LIPA network, that is to say the residential/enterprise network.

In a variant of the embodiment, a message is sent from the HNB 2 to the user equipment 4 rejecting membership of the multicast group, dependent upon the determination that a multicast group of the operators network uses the multicast address of the group. In a specific example, the HNB 2 may inhibit traffic to the UE 4 by sending a "Request MBMS Context Activation Reject" message in order to inform the UE that MBMS is not supported.

If on the other hand, the authorization is denied in this step, the HNB 2 does route multicast traffic of the requested group to the UE 4.

According to a further embodiment of the invention, the HNB 2 determines whether or not a multicast group of the mobile operator's core network has the first multicast address by determining whether or not the first multicast address is present in a list of addresses of multicast groups relating to the first data network. Preferably, the list is held at the HNB 2, or in a database to which the HNB 2 has access. For example, the operator may list multicast addresses of a set of MBMS multicast mode service groups (popular ones or those used by the owner of the HNB 2) to prevent collisions with these multicast groups.

It has been seen that embodiments of the invention may determine whether to allow the user equipment to join a IP multicast group by deciding whether to route multicast traffic following a IGMP/MLD join request from a user equipment to the network, based on requesting authorization by the network. The request may use existing Gmb Authorisation procedures, and in effect checks against a collision with existing IP multicast addresses allocated for MBMS services.

Alternatively, it has been seen that the determination as to whether or not to route the requested traffic may be based on static information stored locally at the HNB 2, or in a database to which the HNB 2 has access; the information may be stored in the local egress point of the IP traffic in the local network, for example the L-GW 18.

In a variant of the embodiments, a message may be sent from the HNB 2 to the user equipment rejecting membership of the requested multicast group, based on a determination that the address may be used by the mobile operator's core network. That is to say, when it is determined that collisions may occur between MBMS services and the IP multicast group the user equipment requests to join, the HNB 2 rejects the request by sending the related MBMS reject message, which appears as a service reject to the user equipment.

It can be seen that according to embodiments of the invention, the HNB will prevent the situation where user equipment that supports MBMS multicast mode receives multicast packets from the LIPA network that are unexpected while it was attempting to join an MBMS service using Multicast Delivery Mode. This unexpected traffic would confuse or possibly even crash the UE's multicast based client MBMS application. Thus, embodiments of the invention ensure well-defined operation for UEs that support multicast mode MBMS.

Figure 4:
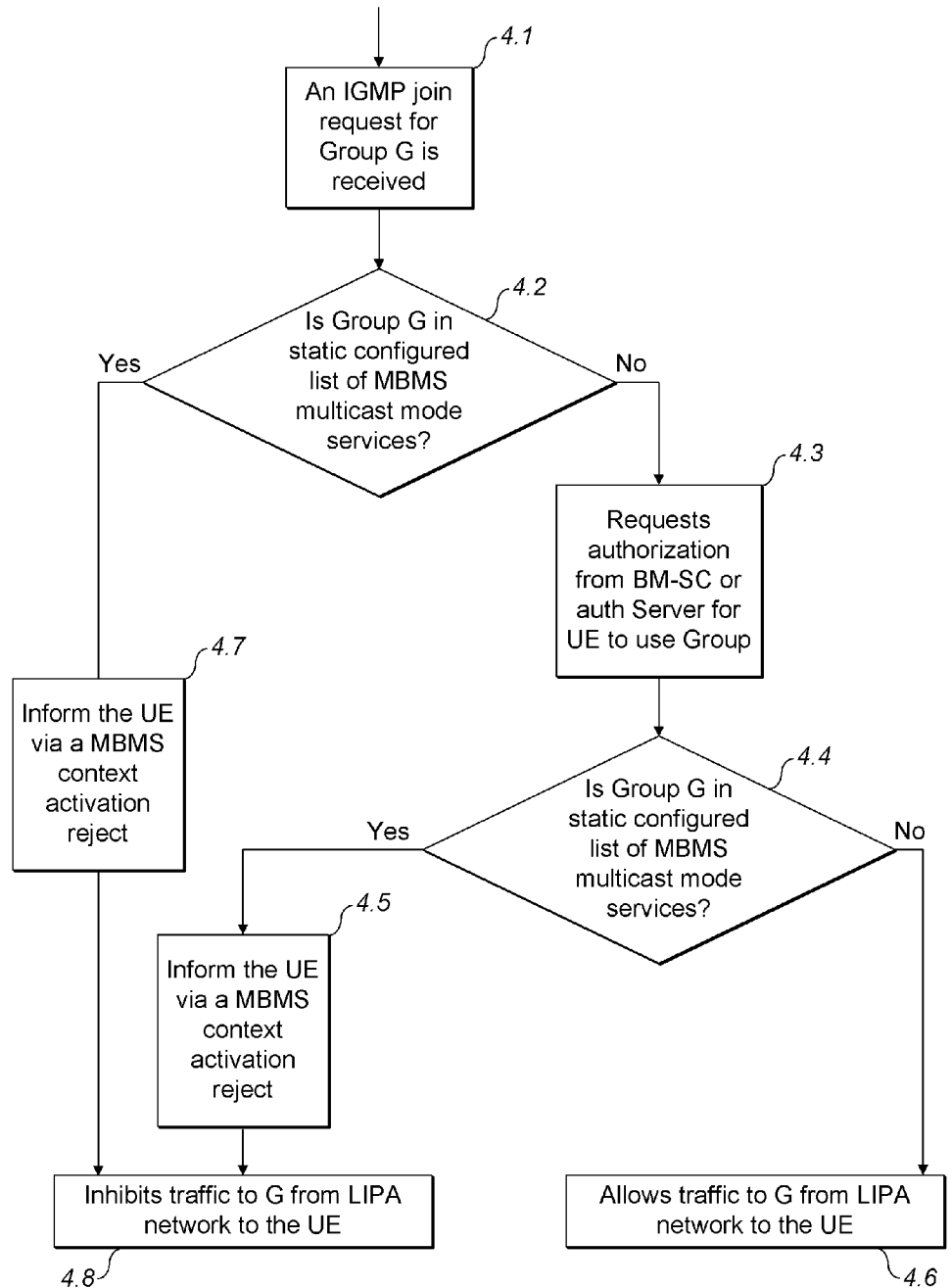
FIG. 4 is a schematic diagram showing a flow diagram according to an embodiment of the invention.

FIG. 4 illustrates a yet further embodiment of the invention, in which it is first determined whether or not a multicast address is present in a list of addresses of multicast groups relating to the first data network, and if it is not, then a message is sent from the router node to a serving node of the first data network requesting authorisation to join the first multicast group. This approach will minimise signalling, but has the advantage that it may be determined that the first data network uses the first multicast address in the case that the list is out-of-date.

Referring to FIG. 4, firstly a message is received from the user equipment at the HNB 2 requesting membership of a first multicast group having a first multicast address. Specifically, a IGMP join request for a group G is received.

It may be determined whether the first multicast address is present in a list of addresses of multicast groups relating to a mobile operator's data network. Specifically, it may be determined whether or not group G is in a static configured list of MBMS multicast mode services.

If the determination is affirmative, then the HNB 2 inhibits receipt of multicast traffic having the first multicast address from at least a residential/enterprise network by the user equipment, by discarding traffic having the multicast address received from the residential/enterprise network, that is to say by not routing the traffic. Specifically, the HNB 2 does not route traffic addressed to G from the LIPA network to the user equipment. In a variant, the HNB 2 may in addition not route traffic from the mobile operator's core network, that is to say MBMS traffic, having the first multicast address to the user equipment.

If the determination is negative, then the HNB 2 may send a message to a serving node of the mobile operator's network requesting authorisation to join the first multicast group. Specifically, the HNB requests authorisation from the BM-SC 14 or authorisation server for the UE 4 to use group G.

It may be then determined that a multicast group of the mobile operator's network uses the first multicast address. This may be determined on the basis of whether or not group G, in this example, is in a static configured list of MBMS multicast mode services held, for example, at a serving node of the mobile operator's network, for example at the BM-SC 14.

If the determination is affirmative, then a message is sent from the HNB 2 to the user equipment rejecting membership of the multicast group. Specifically, the HNB 2 send a MBMS context activation reject message to the user equipment.

If the determination is negative, then the HNB 2 routes traffic from the residential/enterprise network to the user equipment, since it has been determined that there has not been a clash of multicast IP addresses between the mobile operator's network 4 and the residential/enterprise network 6, that may be referred to as the LIPA network. Specifically, the HNB 2 routes traffic from the LIPA network to the UE 4.

In variants of embodiments of the invention, the first determination of FIG. 4, that is to say whether the first multicast address is present in a list of addresses of multicast groups relating to a mobile operator's data network, may be omitted, and the process may continue direct to the step of sending a message to a serving node of the mobile operator's network requesting authorisation to join the first multicast group.

In alternative embodiments of the invention, the HNB 2 may proceed to route traffic from the residential/enterprise network to the user equipment, on the basis of the first determination of FIG. 4, that is to say whether the first multicast address is present in a list of addresses of multicast groups relating to a mobile operator's data network.

Figure 5:
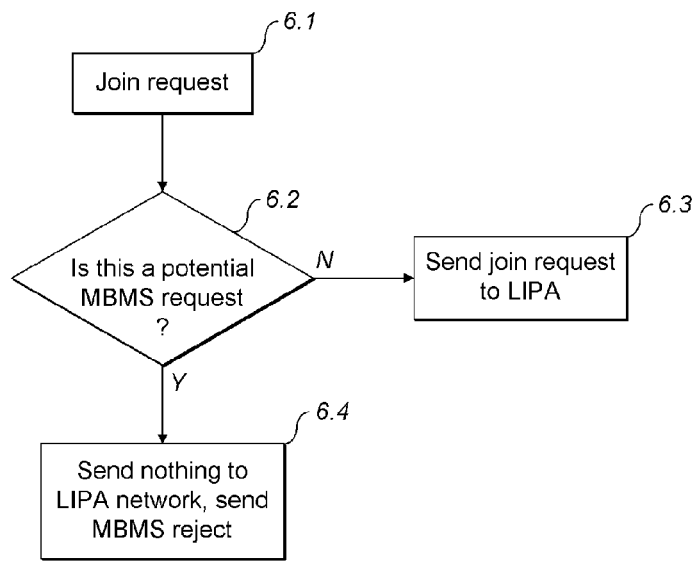
FIG. 5 is a schematic diagram illustrating a principle of operation that may be used by embodiments of the invention.

FIG. 5 illustrates a principle of operation that may be used by embodiments of the invention. At step 6.1, a join request relating to a first multicast group having a first multicast group is received from a user equipment 4 at a router node, typically a Home Node B2.

At step 6.2, it is determined whether or not the request is a potential MBMS request, that is to say, it is determined whether or not a mobile operator's core network to which the Home Node B is connected uses the first multicast address for MBMS services, for example by consulting a list of MBMS addresses that the first address is used by the operator's core network, in particular as an address associated with a MBMS service.

If it does, then at step 6.4 the Home Node B 2 does not send a message to the residential/enterprise network 6, that is to say the LIPA network. In particular, it does not route a message to the LIPA network requesting membership of the first multicast group. In addition, the Home Node B may, in some embodiments of the invention, not route a message to the mobile operator's core network requesting membership of the first multicast group. The Home Node B may in addition send a message to the user equipment 4 indicating that MBMS service is rejected.

If the determination at step 6.2 is negative, then at step 6.3 the Home Node B may send a request to the home/residential network 6, i.e. the LIPA network, requesting membership of the first multicast group. Connection to the LIPA network may be made in the knowledge that the request is unlikely to relate to an MBMS service in the operator's core network.

Figure 6:
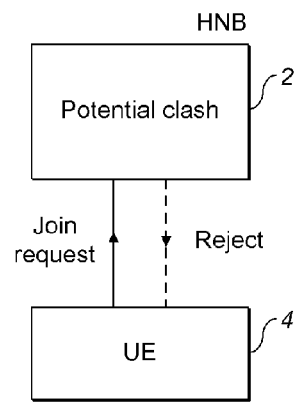
FIG. 6 is a schematic diagram showing transmission of messages, in a case where there is a potential clash of multicast addresses, according to an embodiment of the invention.
Figure 7:
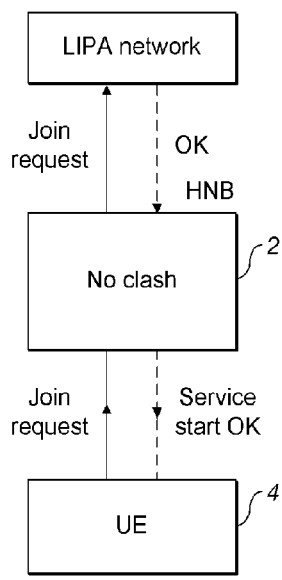
FIG. 7 is a schematic diagram showing transmission of messages, in a case where there unlikely to be a clash of multicast addresses, according to an embodiment of the invention.

FIG. 6 and FIG. 7 show in a schematic form an exchange of messages according to embodiments of the invention.

In FIG. 6, it is determined at the Home Node B2 that there is potential clash of multicast addresses between the residential/enterprise network and the mobile operator's core network. As previously described, this may be on the basis of a determination that a multicast group of the first data network uses the first multicast address. On the basis of the determination, a request to join a multicast group received from a user equipment may be rejected, for example by sending a message to the user equipment rejecting the request.

In FIG. 7, by contrast, it is determined at the Home Node B2 that there is unlikely to be a clash of multicast addresses between the residential/enterprise network and the mobile operator's core network. In this case, a join requesrt may be passed to the LIPA network. The LIPA network may, as applicable to the protocol employed, acknowledge or authorise the join request. The Home Node B2 may then, if appropriate, send a message to the user equipment 4 indicating that a multicast service will be provided.

Figure 8:
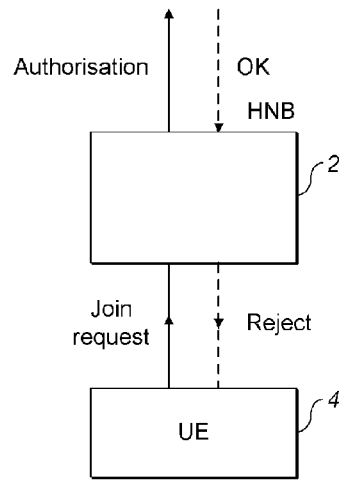
FIG. 8 is a schematic diagram showing transmission of messages according to an embodiment of the invention.
Figure 9:
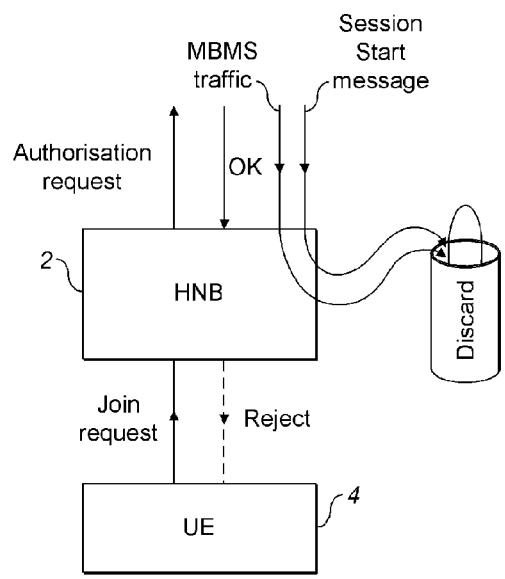
FIG. 9 is a schematic diagram showing transmission of messages according to an embodiment of the invention.
Figure 10:
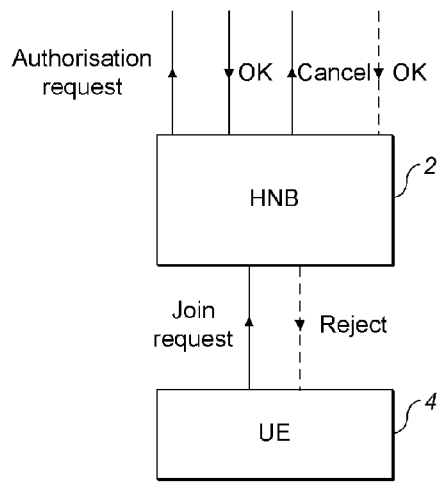
FIG. 10 is a schematic diagram showing transmission of messages according to an embodiment of the invention.

FIGS. 8, 9 and 10 illustrate methods that may be employed to determine that a multicast group of the mobile operator's network uses the first multicast address, and in particular that the first multicast address is used in connection with a MBMS service.

FIG. 8 illustrates a method in which the Home Node B2 requests authorisation to join a first multicast group, as a method of determining whether or not a multicast group of the mobile operator's network uses the first multicast address. If authorisation is received, then it is determined that the first multicast address is used by the mobile operator's network, and in particular it is assumed that the address is used for a MBMS service. Alternatively, or in addition, the determination may be made by consulting a list of multicast addresses relating to the mobile operator's core network held at the Home Node B4, or accessible by the Home Node B4. A message is sent to the user equipment 4 rejecting membership of the multicast group. The message may be for example be a MBMS context activation reject.

In FIG. 9, the determination as to whether or not a multicast group of the mobile operator's network uses the first multicast address proceeds as has been described in connection with FIG. 8, but inhibition of receipt of traffic by the user equipment 2 from the mobile operator's core network is achieved alternatively, or in addition to the method of FIG. 8, by discarding multicast traffic, and in particular MBMS traffic, received from the mobile operator's core network, preferably at the Home Node B2. For example, a session start message may be discarded. A reject message may be sent the user equipment rejecting the join request as described in connection with FIG. 8.

In FIG. 10, the determination as to whether or not a multicast group of the mobile operator's network uses the first multicast address proceeds as has been described in connection with FIG. 8, but inhibition of receipt of traffic by the user equipment 2 from the mobile operator's core network is achieved alternatively, or in addition to the methods of FIG. 8 or 9, by sending a message cancelling the authorisation request to the mobile operator's core network. The server system may send an acknowledgement of the cancellation to the Home Node B2.

Similar methods to those described in connection to FIGS. 8, 9 and 10 may be used to inhibit receipt of traffic by the user equipment 2 from the residential/enterprise network, dependent on the capabilities of the network.

As already mentioned, inhibition of receipt of multicast traffic by the user equipment 2 from either or both data networks may also be achieved by not sending a request to join a multicast group of the respective network.

Industrial Applicability

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of routing multicast traffic, suitable for use in a network comprising a router node connected to a first data network and to a second data network, the router node having a capability to route multicast traffic from the first data network to a user equipment and to route multicast traffic information from the second data network to the user equipment, the method comprising:
   receiving, by the router node, a first message from the user equipment, the first message requesting membership of a first multicast group having a first multicast address;
   determining, by the router node, whether the first multicast address is used as a multicast address in the first network; and
   in response to determining that the first network uses the first multicast address as a multicast address, inhibiting, by the router node, receipt of multicast traffic having the first multicast address from at least the second data network by the user equipment.

2. The method according to claim 1, the method further comprising inhibiting receipt of multicast traffic having the first multicast address from the first data network by the user equipment according to the determination as to whether the first multicast address is used as a multicast address in the first network.

3. The method according to claim 1, wherein the determination as to whether the first message relates to a multicast address in the first network is performed at least in part by:
   receiving an indication from the user equipment indicating that the user equipment has a capability to receive a multicast service using a multicast address in the first network; and
   determining that the first message may relate to a multicast address in the first network dependent on receipt of the indication.

4. The method according to claim 1, wherein the determination as to whether the first multicast address is used as a multicast address in the first network is performed at least in part by:
   sending a second message from the router node to a serving node of the first data network, the second message requesting authorization to join the first multicast group; and
   determining that the first multicast address may relate to a multicast address in the first network dependent upon receipt of authorization to join the first multicast group from the serving node of the first data network.

5. The method according to claim 1, the method further comprising determining whether the first multicast address is used as a multicast address in the first network by determining whether first multicast address is present in a list of addresses of multicast groups relating to the first data network.

6. The method according to claim 5, wherein said list is stored at the router node.

7. The method according to claim 5, wherein said list is stored in a database on a different node to which the router node has access.

8. The method according to claim 4, the method further comprising sending the second message according to a determination that the first multicast address is not present in a list of addresses of multicast groups relating to the first data network.

9. The method according to claim 1, wherein the router node is a wireless router node.

10. The method according to claim 4, wherein the second message comprises an indication that the second message is originated by a wireless router node.

11. The method according to claim 4, wherein the second message comprises an indication that a multicast service should not be provided.

12. The method according to claim 1, wherein multicast traffic from the first network data network is provided by a Broadcast Multicast Service Centre.

13. The method according to claim 1, the method further comprising discarding traffic having the first multicast address received from at least the second data network according to the determination that the first message relates to a multicast address in the first network.

14. The method according to claim 1, the method further comprising sending a message from the router node to the user equipment rejecting membership of the multicast group according to the determination that the first message relates to a multicast address in the first network.

15. The method according to claim 1, wherein the inhibiting receipt of multicast traffic having the first multicast address from at least the second data network by the user equipment comprises not sending a message requesting membership of a first multicast group having a first multicast address.

16. The method according to claim 1, wherein the router node does not allow the user equipment to join the Multicast Broadcast Multimedia Service in response to receipt of the first message.

17. The method according to claim 1, wherein the router node is a Home Node B.

18. The method according to claim 1, wherein the first data network comprises a cellular wireless core network.

19. The method according to claim 1, wherein the second data network comprises a residential data network.

20. The method according to claim 1, wherein the second data network comprises an enterprise data network.

21. A router node, suitable for connection to a first data network and to a second data network, the router node having a capability to route multicast traffic from the first data network to a user equipment and to route multicast traffic information from the second data network to the user equipment, the router node being arranged to:
   receive a first message from the user equipment, the first message requesting membership of a first multicast group having a first multicast address;
   determine whether the first multicast address is used as a multicast address in the first network; and
   in response to determining that the first network uses the first multicast address as a multicast address, inhibit receipt of multicast traffic having the first multicast address from at least the second data network by the user equipment.

22. A method of routing multicast traffic, suitable for use in a network comprising a router node connected to a first data network and to a second data network, the router node having a capability to route multicast traffic from the first data network to a user equipment and to route multicast traffic information from the second data network to the user equipment, the method comprising:
   receiving, by the router node, a first message from the user equipment, the first message requesting membership of a first multicast group having a first multicast address; and
   inhibiting receipt of multicast traffic having the first multicast address from at least the second data network by the user equipment according to a determination as to whether the user equipment is capable of supporting services using a multicast address in the first network.

23. A router node, suitable for connection to a first data network and to a second data network, the router node having a capability to route multicast traffic from the first data network to a user equipment and to route multicast traffic information from the second data network to the user equipment, the router node being arranged to:
   receive a first message from the user equipment, the first message requesting membership of a first multicast group having a first multicast address; and
   inhibit receipt of multicast traffic having the first multicast address from at least the second data network by the user equipment according to a determination as to whether the user equipment is capable of supporting services using a multicast address in the first network.

24. The method of claim 1, wherein the determination as to whether the first message relates to a multicast address in the first network comprises:
   determining whether the first multicast address of the first multicast group conflicts with a multicasting address provided by the first network.

25. The method of claim 1, wherein the determination as to whether the first message relates to a multicast address in the first network comprises:
   determining whether the first multicast address of the first multicast group is an address used by the first network.

26. The method of claim 1, further comprising:
   routing multicast traffic from the first data network to the user equipment;
   routing multicast traffic from the second data network to the user equipment,
   wherein the first message corresponds to a request to join the first multicast group having the first multicast address provided by the second network, and
   wherein the router node blocks multicast traffic, from the second network, that is associated with the first multicast address.

27. The method of claim 26, wherein the router node routes, to the user equipment, the multicast traffic, from the first network, that is associated with the first multicast address in response to receipt of a request from the user equipment to join a multicast group having the first multicast address on the first network.

* * * * *